United States Patent [19]
Yano et al.

[11] Patent Number: 5,289,572
[45] Date of Patent: Feb. 22, 1994

[54] ELECTRONIC MAP COMBINED WITH USER SERVICE INFORMATION

[75] Inventors: Haruto Yano; Yoshiaki Hirasa; Toshimichi Tokunaga, all of Hiroshima; Chisato Yoshida, Hyogo; Katsuaki Matsumoto, Hyogo; Masako Ohta, Hyogo, all of Japan

[73] Assignee: Mitsubishi Denki Kabushiki Kaisha, Chiyoda, Japan

[21] Appl. No.: 26,201

[22] Filed: Feb. 26, 1993

Related U.S. Application Data

[63] Continuation of Ser. No. 602,684, Oct. 24, 1990, abandoned.

[30] Foreign Application Priority Data

Oct. 24, 1989 [JP] Japan ................................ 1-277555

[51] Int. Cl.⁵ .............................................. G06F 13/00
[52] U.S. Cl. ............................. 395/155; 364/DIG. 2; 364/922.8; 364/948.2; 364/948.21
[58] Field of Search ................. 364/DIG. 1 MS File, 364/DIG. 2 MS File, 449; 395/155, 800; 340/990, 995

[56] References Cited

U.S. PATENT DOCUMENTS

| | | | |
|---|---|---|---|
| 4,646,089 | 2/1987 | Takanabe et al. | 364/449 |
| 4,890,104 | 12/1989 | Takanabe et al. | 340/995 |
| 4,905,163 | 2/1990 | Garber et al. | 364/513 |
| 4,954,959 | 9/1990 | Moroto et al. | 364/449 |
| 4,974,170 | 11/1992 | Bouve et al. | 340/990 |
| 5,067,082 | 11/1991 | Nimura et al. | 364/449 |

FOREIGN PATENT DOCUMENTS 61-18194  5/1986  Japan .

OTHER PUBLICATIONS

Nov. 16, 1987 issue of "Nikkei Electronics" (No. 434, pp. 119–130), a Japanese publication.

*Primary Examiner*—Robert B. Harrell

[57] ABSTRACT

A system allowing both map data and service-related data to be displayed on request for users' reference. Locations of candidate service-offering establishments are displayed in the map covering a specific geographical region. When one of these establishments is selected, detailed service-related information on that establishment is provided on the display screen. This allows the users to quickly obtain and process necessary service-related information wherever they are and to take action accordingly.

19 Claims, 4 Drawing Sheets

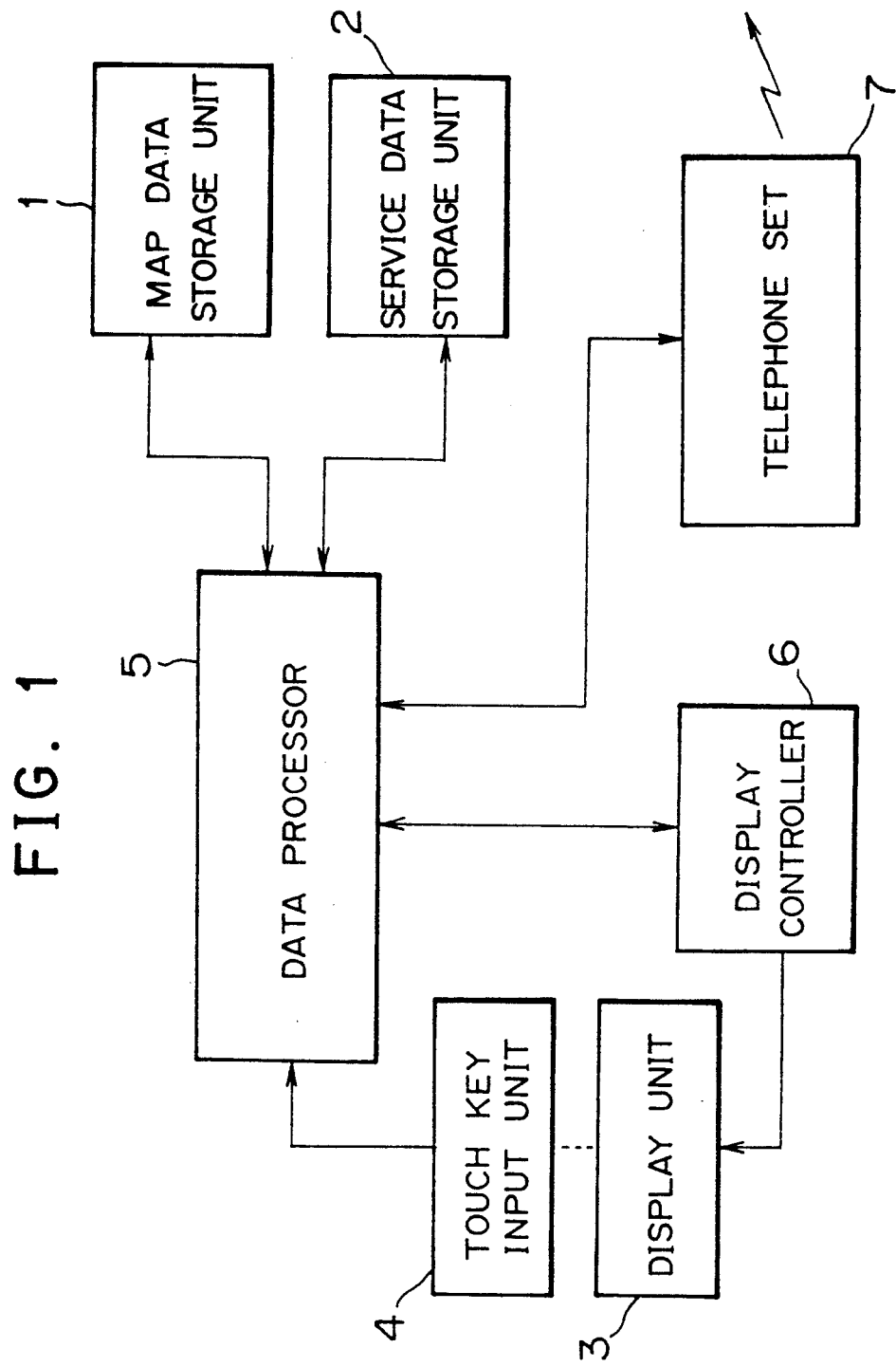

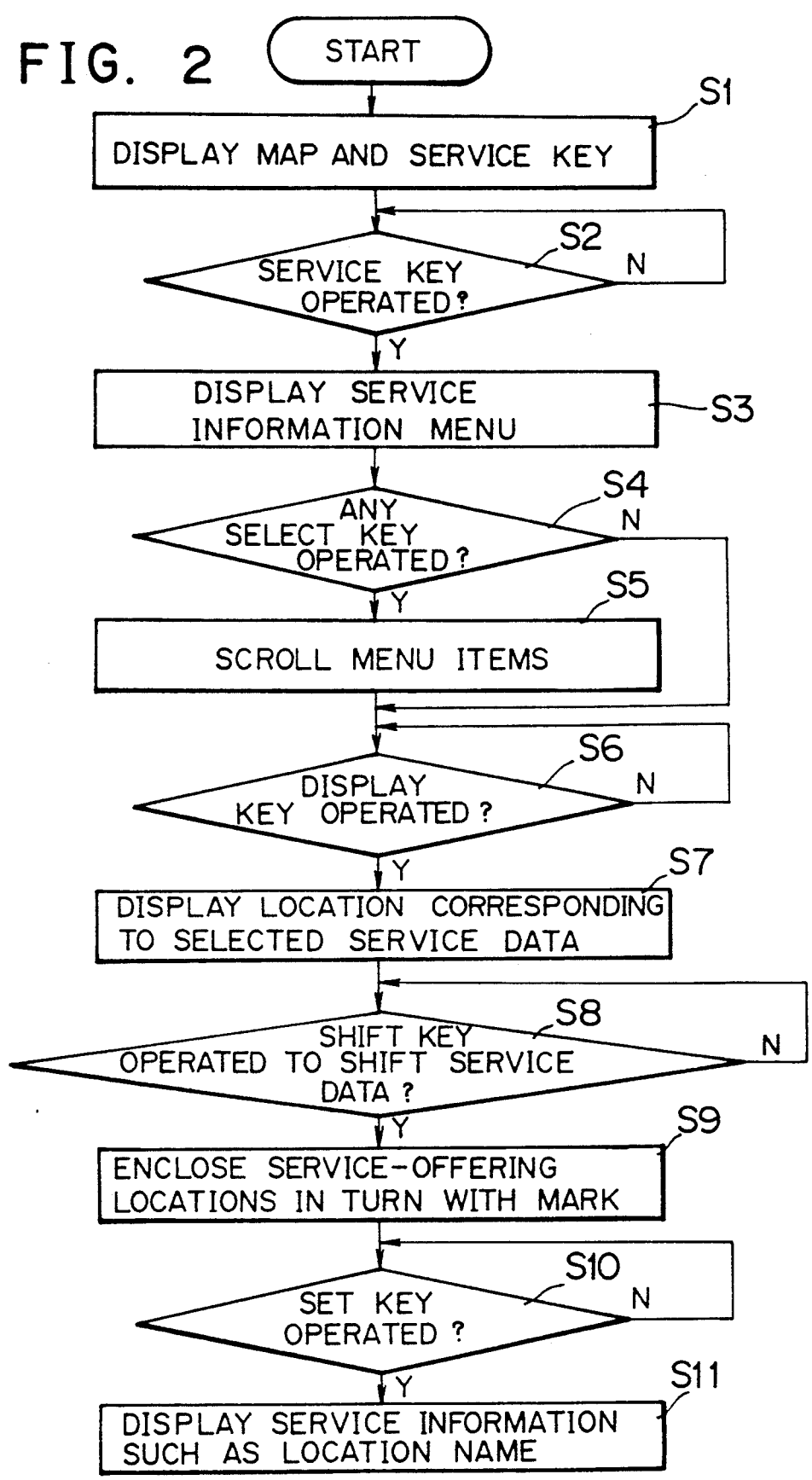

ELECTRONIC MAP COMBINED WITH USER SERVICE INFORMATION

This application is a continuation of application Ser. No. 07/602,684 filed on Oct. 24, 1990, now abandoned.

BACKGROUND OF THE INVENTION

1. Field of the Invention

The present invention relates to a service information system for displaying or otherwise outputting service-related, user-requested information for use by the user.

2. Description of the Prior Art

When looking for, as an example, a hotel to stay overnight, one conventionally checks maps of the applicable geographical region to see where an appropriate hotel is located, while separately looking up telephone directories or other relevant brochures to ascertain the address and telephone number of the target establishment.

On-board vehicle navigation apparatus are disclosed illustratively in Japanese Patent Laid-open No. 61-18194 as well as in the Nov. 16, 1987 issue of "Nikkei Electronics" (No. 434, pp. 119-130), a Japanese publication. These on-board navigation apparatus are capable of showing on a display device maps of, for example, a desired geographical region of Japan on varying reduced scales when touch key input areas on the display screen are touched as needed. The map information thus displayed is used to navigate the vehicle that incorporates the apparatus. Designed to provide such navigation-related information, the prior art apparatus are not equipped to provide detailed, service-related information that may be required by users. One disadvantage of such prior art apparatus is that they leave the users to put up with the often tedious, time-consuming chores of looking up maps, telephone directories and other materials to acquire detailed service information needed.

SUMMARY OF THE INVENTION

It is therefore an object of the present invention to provide a service information system which readily provides users with detailed service-related information on request.

In achieving the foregoing and other objects of the invention and according to one aspect thereof, there is provided a service information system comprising a map data storage means, a service data storage means, a display means, a selection means for outputting selection signals by which to designate map data and service data, and a control means for reading from storage the map data and service data about a specified service-catering establishment, wherein the control means displays the location of the establishment on the map shown on the display means, the control means further displaying detailed information about the service provided by the establishment.

According to another aspect of the invention, there is provided a service information system comprising a selection means, a control means and a display means, wherein the selection means selects map data and service data as specified, the control means causing the specified map data to be displayed on the display means, the control means further causing candidate service establishments to overlay the map on the display means, the display means further displaying information on the service of the establishment specified by a selection signal from the selection means.

BRIEF DESCRIPTION OF THE DRAWINGS

FIG. 1 is a block diagram of a preferred embodiment of the service information system according to the present invention;

FIG. 2 is a flowchart describing how a data processor contained in the embodiment of FIG. 1 operates.

DESCRIPTION OF THE PREFERRED EMBODIMENT

Figure 3C:
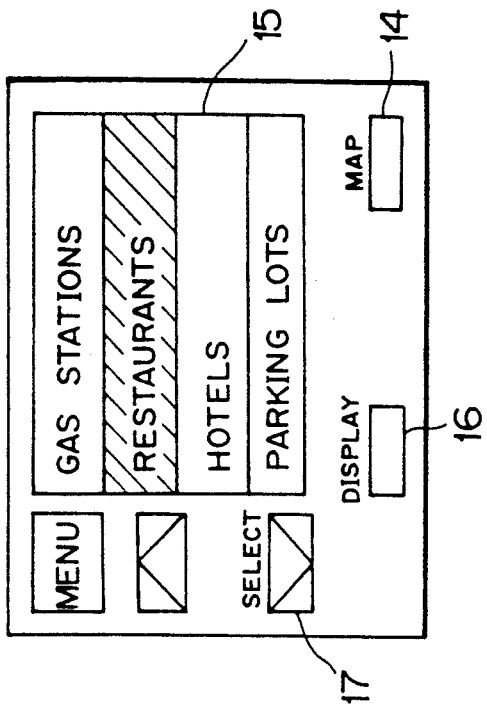
FIGS. 3A, 3B, 3C, 3D, 3E, 3F, and 3G are sets of views showing examples of displays appearing on a display device contained in the embodiment of FIG. 1.

The preferred embodiment of the invention will now be described with reference to the accompanying drawings. FIG. 1 is a block diagram showing how the preferred embodiment of the invention is configured. In FIG. 1, reference numeral 1 is a map data storage unit that stores map data used to display geographical regions through which the vehicle is intended or likely to run; 2 is a service data storage unit that stores service data such as on-the-map locations, names, addresses and telephone numbers of hotels, restaurants and other service-related establishments; 3 is a display unit such as a CRT display or LCD on which to display the map data and service data; and 4 is a pressure-sensitive or infrared-sensing touch key input unit of known technology which is provided over the display unit 3 and which accepts key inputs from touches with fingertips. On the touch key input unit 4, there are illustratively provided 20 touch operation areas which are obtained by splitting the screen. When any of these areas is touched by the operator, the unit 4 generates a serial signal as a selection signal corresponding to the selected area. Reference numeral 5 is a data processor that computes digital data based on a predetermined control program. In accordance with key operation signals that are input from the touch key input unit 4, the data processor 5 processes data read from the map data storage unit 1 and service data storage unit 2, the results being output as display signals. Reference numeral 6 is a display controller that receives display signals from the data processor 5. The display controller 6 stores the map display data, service display data and touch key display data on a specific geographical region and displays such data on the display unit 3.

FIG. 2 shows the flow of steps to be taken by the data processor 5 to display service-related information. These steps are stored in the form of a control program in the storage of the data processor 5.

Figure 3D:
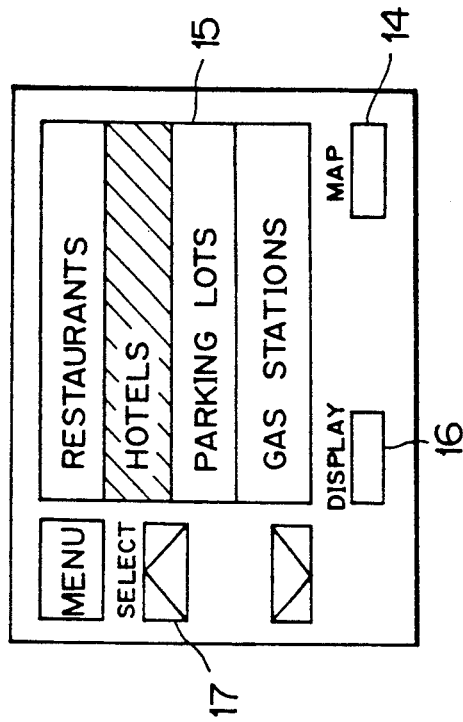
Figure 3A:
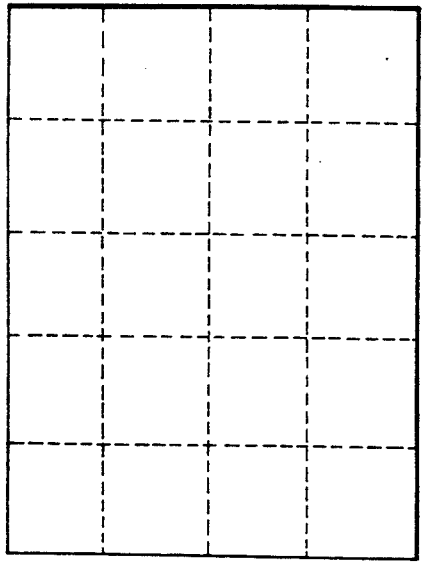

FIGS. 3A to 3G depict typical displays as they change on the display unit 3. The screen front of the display unit 3 is equipped with the touch key input unit 4. As shown in FIG. 3A, the touch key input unit 4 has the screen surface split into 20 touch areas.

Figure 3B:
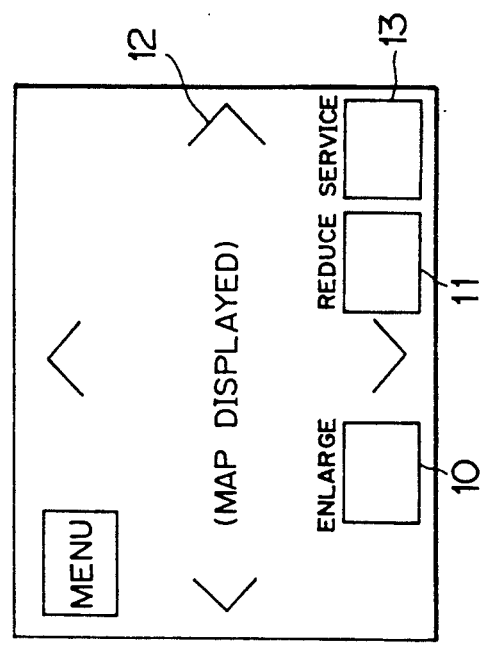

How the embodiment works will now be described with reference to FIGS. 1 through 3. In step S1, the data processor 5 conventionally reads map data from the map data storage unit 1. Using the map data, the data processor 5 causes the display controller 6 to display a map of the target region on the display unit 3. At the same time, the touch keys of the touch key input unit 4 are displayed (FIG. 3B). As shown in FIG. 3B, an ENLARGE touch key 10 and a REDUCE touch key 11 are used, respectively, to enlarge and reduce the displayed map; SCROLL keys 12 scroll the map vertically and horizontally when operated; and a SERVICE key 13 is used to display service information.

In step S2, the data processor 5 waits for the operator to touch the SERVICE key 13 of the touch key input unit 4. If the SERVICE key 13 is found to be operated, step S3 is reached. In step S3, using the service data read from the service data storage unit 2, the data processor 5 causes the display controller 6 to display a service information menu or the like on the display unit 3 (FIG. 3C). In FIG. 3C, a MAP key 14 restores the map display of FIG. 3B when operated. Menu items 15 of service information illustratively contain a list of gas stations, restaurants, hotels and parking lots, with the "restaurants" item currently selected in the figure. A DISPLAY key 16 is used to display on the map the locations of candidate service-offering establishments corresponding to the selected menu item. A pair of SELECT keys 17 scroll the menu items 15 of service information upward or downward when operated.

In step S4, a check is made to see if any of the SELECT keys 17 is operated. If either SELECT key 17 is found to be operated, the menu items 15 are scrolled in keeping with the amount of key operation (FIG. 3D). In FIG. 3D, the selected item is "hotels," after the entire items are scrolled one item upward. It is predetermined that in the list, the second item location from above always indicates the selected item. If neither of the SELECT keys 17 is operated, a jump is made to step S6. More specifically, the scrolling process above takes place as follows: The data processor 5 finds out that either of the SELECT key 17 is operated upon receipt of an operation signal from the touch key input unit 4. In response, the data processor 5 supplies the display controller 6 with a scroll control signal representing the amount of the key operation specified by the operation signal received. Using the scroll control signal, the display controller 6 controls the display unit 3 accordingly.

Figure 3E:
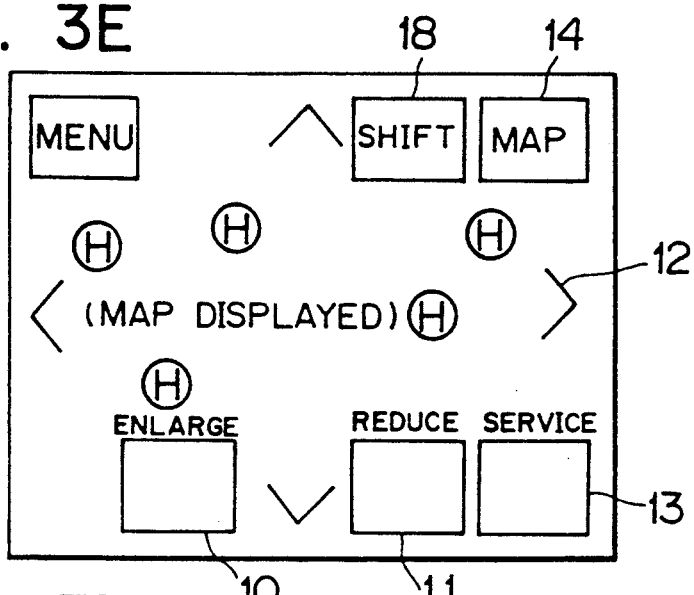

In step S6, the data processor 5 waits for the DISPLAY key 16 to be operated. If the DISPLAY key 16 is operated in the state of FIG. 3D, step S7 is reached. The resulting operation signal causes the locations of candidate service establishments (e.g., hotels) in the same map area as shown in FIG. 3B to be retrieved from the service data storage unit 2 and displayed on the display unit 3 through the display controller 6, the service establishments corresponding to the selected item. In the map displayed on the display unit 3, the locations of the establishments (e.g., hotels) keyed to the selected item may be illustratively indicated by marks (Ⓗ), as shown in FIG. 3E. In FIG. 3E, a SHIFT key 18 is used to specify each of the displayed hotels in turn.

Figure 3F:
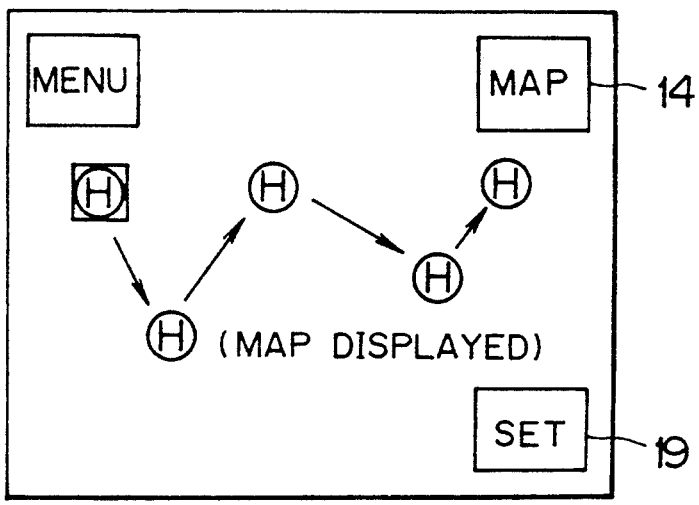

In step S8, the data processor 5 waits for the SHIFT key 18 of the touch key input unit 4 to be operated. If the SHIFT key 18 is found to be operated, step S9 is reached. In step S9, the H marks are successively enclosed with, say, a rectangle unitl a desired hotel is spotted and selected (FIG. 3F). As shown in FIG. 3F, the enclosing of the H marks is repeated in the arrowed direction until a SET key 19 is operated. To select the desired hotel, the operator touches the SET key 19 of the touch key input unit 4 while the H mark indicating the target hotel is being enclosed with a rectangle.

Figure 3G:
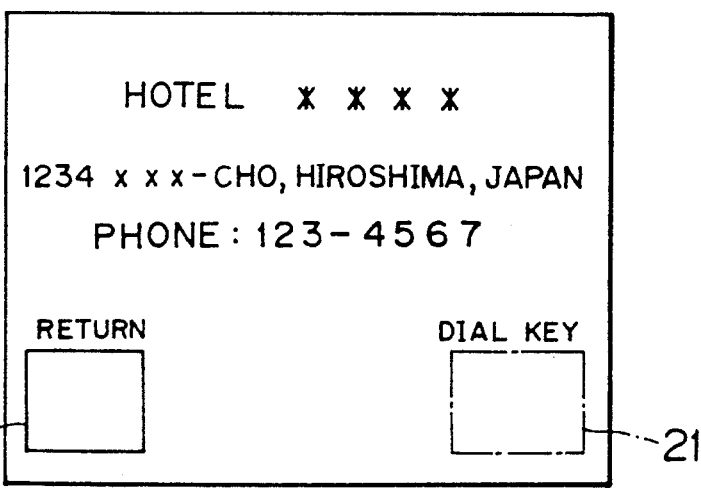

In step S10, the data processor 5 waits for the SET key 19 to be operated. If the SET key 19 is found to be operated, step S11 is reached. In step 11, the data processor 5 causes the display controller 6 to display such service data as the name, address and telephone number of the selected establishment (e.g., hotel) on the display unit 3 (FIG. 3G). In FIG. 3G, a RETURN key 20 restores the display status of FIG. 3F when operated. With particular reference to FIG. 3, the steps described above have addressed the case in which the "hotels" item is selected. Alternatively, the same steps apply to any of the other items on the menu.

As indicated by dashed lines in FIG. 1, a telephone set 7 may be connected to the data processor 5. In that case, a DIAL key 21 may be provided on the screen as shown in FIG. 3G. Operating the DIAL key 21 causes the data processor 5 to forward the telephone number data on the displayed establishment (e.g., hotel) as well as a transmit command to the telephone set 7. On receiving the transmit command and telephone number, the telephone set 7 automatically dials the telephone number.

The MENU key shown throughout the subfigures of FIG. 3 is a key that restores the menu display when operated. It will be appreciated that FIG. 2 depicts an example flow of steps to obtain detailed service data, and that if any other touch key is operated in FIGS. 3B-3G, another flow of steps corresponding to the selected touch key is executed.

As described and according to the invention, map data and service data are specified as desired after retrieval from storage. The locations of candidate service establishments are displayed in the map of a specific geographical region on the display unit. When a desired service establishment is selected, detailed service information thereabout is displayed for the user's reference. This allows the user to readily obtain service-related information whereby it is easy to go directly to the desired establishment or to contact it as needed.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An electronic service information system for a moving vehicle comprising:
   map data storage means for storing map data;
   service data storage means for storing service data selected from the group consisting of gas stations, restaurants, hotels, or parking lots said service data corresponding to the map data;
   display means selected from the group consisting of cathode ray tubes or liquid crystal displays for selectively displaying the map data and the service data, in menu format separately and a distinct one of said service data group combined with and on a specific location on the map data;
   means for specifically designating one specific member of the distinct group displayed; and
   means for displaying further information about said one specific member.

2. The electronic service information of claim 1, wherein said means for displaying further information is a display that separately displays alone said further information.

3. The electronic service information system of claim 2, wherein said further information includes telephone number of said specific member.

4. The electronic service information system of claim 3 further including means for transmitting the telephone number to a telephone set for automatically dialing said telephone number.

5. The electronic service information system of claim 2, wherein said further information includes name and address of said specific member.

6. The service information system of claim 2, wherein said service data is a group of gas stations.

7. The service information system of claim 2 wherein said service data is a group of restaurants.

8. The service information system of claim 2 wherein said service data is a group of hotels.

9. The service data information system of claim 2, wherein said service data is a group of parking lots.

10. The electronic service information system of claim 1, wherein said further information includes telephone number of said specific member.

11. The electronic service information system of claim 10 further including means for transmitting the telephone number to a telephone set for automatically dialing said number.

12. The electronic service information system of claim 1, wherein said further information includes name and address and the telephone number of said specific member.

13. The service information system of claim 1, wherein said service data is a group of gas stations.

14. The service information system of claim 1 wherein said service data is a group of restaurants.

15. The service information system of claim 1 wherein said service data is a group of hotels.

16. The service data information system of claim 1, wherein said service data is a group of parking lots.

17. A method of electronically determining and locating a specific service offering establishment on an electronic chargeable display comprising the sequential steps of:

(a) displaying a map of a specific area on a display, (b) actuating and displaying a menu, listing groups of service offering establishments said groups consisting of gas stations, restaurants, hotels or parking lots, (c) selecting one of said groups and displaying location of each member of the group on the map of the specific area, (d) selecting and designating one specific member from said group on said display; and (e) displaying specific detailed information of said specific member selected and designated in step (d).

18. The method of claim 17, wherein in step (e) the displayed specific detailed information is the only information displayed.

19. A service information system for a moving vehicle comprising:

map data storage means for storing map data;

service data storage means for storing various related groups of service data, corresponding to the map data in the moving vehicle;

display means for selectively displaying said map data and said groups of service data separately in one mode and combined with said map data in another mode;

selection means for outputting a plurality of selection signals so as to select a specific geographical region constituted by portions of said map data and to select a particular group of service data items from among said groups of service data; and control means for reading map data on a specific geographical region from said map data storage means upon receipt of said selection signals, said control means further reading a specific group of service data items from said service data storage means, said control means displaying the specific locations of candidate service-offering establishments in the map displayed on said display means, said control means further displaying on said display means detailed service information on any one of said service-offering establishments, said one establishment being selected in accordance with said selection signals.

* * * * *